3,189,357
ANNULAR SEAL WITH KEYED SEALING RING
John Talamonti, Chicago Heights, Ill., assignor to Borg-Warner Corporation, Chicago, Ill., a corporation of Illinois
Filed June 22, 1962, Ser. No. 204,410
2 Claims. (Cl. 277—42)

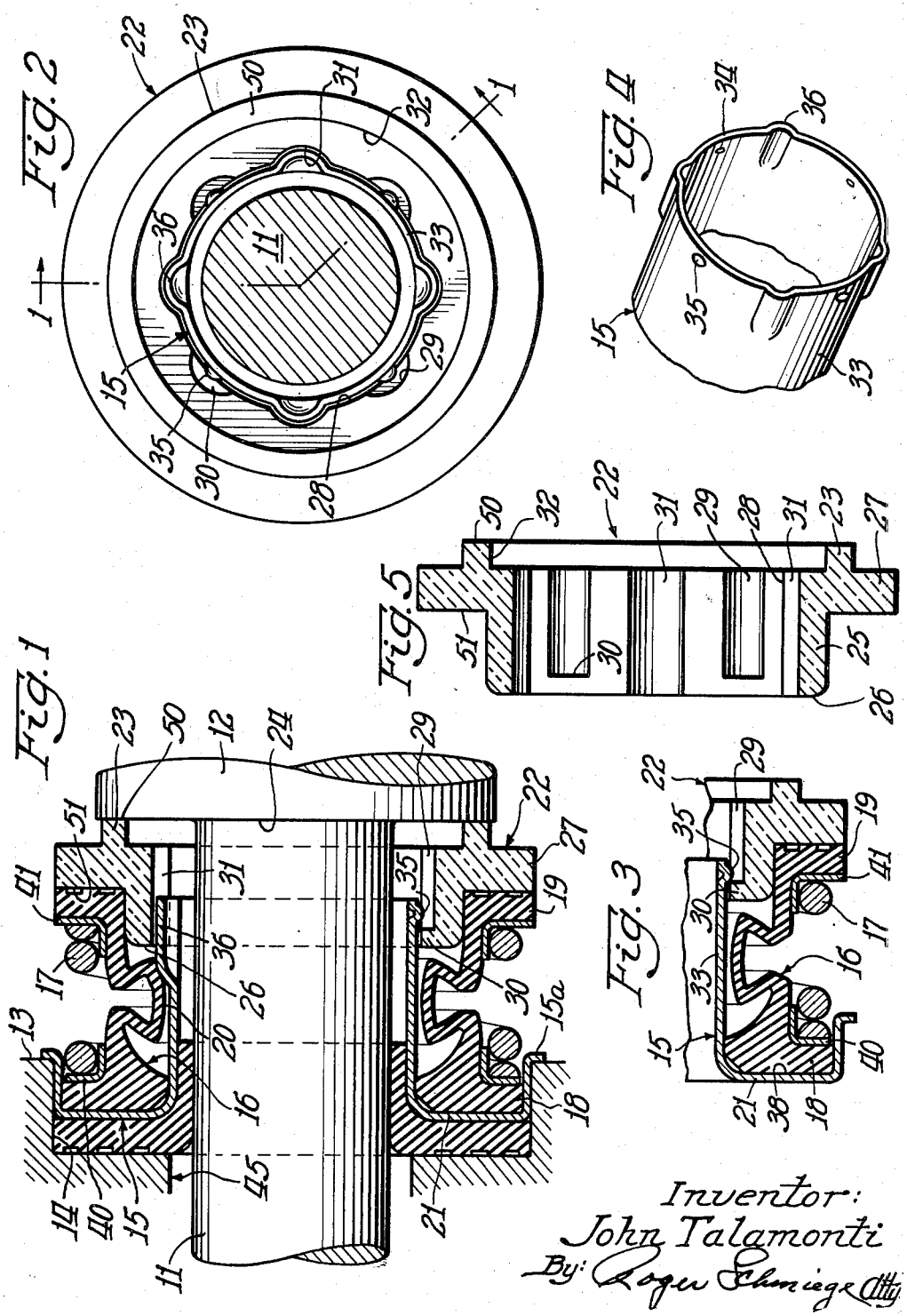

This invention relates to an annular fluid seal with keyed sealing ring and more particularly to seals which are intended to surround a rotating shaft and to make a sealing engagement against the egress of water or other cooling fluid, as for example, between the shaft and a housing therefor. Thus the seal is especially adapted for use in an automobile water pump or the like.

For some installations it is desirable to preload a seal by placing the spring element thereof under compression at the factory and to include with the seal at that time a sealing washer. The sealing ring is generally keyed against relative rotation with respect to the seal and also keyed or locked for limited axial movement. Thus, the sealing device including the washer may be handled as a unit without danger of accidental removal of the washer and may be readily installed in correct operative position with a minimum of skill.

One of the features of this invention is to provide means for keying the sealing ring to the other seal parts against relative rotation and also for keying it to limit axial forward movement of the washer with respect to the body of the seal. Further, this invention contemplates a noncollapsible flexible boot portion that operates in conjunction with the other parts of the seal to provide a new and improved annular fluid seal.

More specifically, it is a particular object of this invention to provide a combination of specific elements which may be assembled by simply stacking or aligning the specific elements with respect to each other, and shifting the elements axially with respect to each other, to thereby provide an integral preloaded fully assembly seal structure.

The term preloaded, as used herein, is defined as an assembled seal structure wherein the resilient member is at least partially compressed irrespective of the position of the sealing washer element with relation to the remaining elements of the seal structure.

The term integral, as used herein, is defined as an assembled seal structure wherein the action of the resilient member will not normally cause disassembly of the seal structure.

The seal assembly of the present invention is particularly characterized as not requiring the conventional adhesives normally used to hold the respective elements together and/or as not requiring the conventional locking lugs to be formed in one of the elements after assembly of the seal structure.

These, and other aspects of the invention, will become apparent from the following description, taken together with the accompanying drawings of illustrative embodiments thereof, and in which drawings:

FIGURE 1 is a view, partially in cross section, of a seal taken along lines 1—1 of FIGURE 2 showing the seal installed in position within a housing for a rotating shaft;

FIGURE 2 is an end view of a seal assembly at its forward or right hand end showing the shaft in cross-section;

FIGURE 3 is a fragmentary cross-sectional view of the seal assembly shown in FIGURE 1 illustrating the parts in their respective positions before the seal assembly is installed within a housing;

FIGURE 4 is a fragmentary perspective forward end view of the tubular member element of the seal assembly shown in FIGURE 1;

FIGURE 5 is a cross-sectional view of the sealing washer element of the seal assembly shown in FIGURE 1.

Referring in detail to the drawings, i.e., FIGURES 1 through 5 inclusive, a drive shaft 11, such as, for example, a water pump drive shaft or the like, is connected to a hub 12 of larger diameter than said shaft. The shaft 11 is capable of rotation in a housing 45, one margin of which is shown at 13. The housing 45 has a recess or counterbore 14, as is conventional in such structures.

Pressed into the recess 14 of housing 45 is an annular cup or casing 15 which serves as a carrier for the seal parts next described. Cup or casing 15 makes a fluid sealing engagement with the wall of the housing recess 14 to preclude the passage of fluid therepast, thus constituting one of the sealing surfaces of the assembly.

Within cup 15 are other sealing parts, which include a noncollapsible body or boot 16 and a helical coil spring 17, end convolutions of which bear against outer annular retaining rings 40 and 41. Annular rings 40 and 41 are of L-shaped cross section. Annular rings 40 and 41 bear against flanges 18 and 19 respectively of boot 16. Boot 16 has a distortable middle section 20 for purposes of accommodation of longitudinally compressed or extended positions of spring 17. Boot 16 may be constructed of an elastomeric material such as natural or synthetic rubber or the like. A portion of boot 16 including flange 18 bears against cup 15 at the rearward portion thereof and thus prevents accidental disengagement of parts or collapse of said boot due to compression of spring 17. Spring 17 normally tends to expand boot 16, within limitations of engagement of the rear boot flange 18 with the radial wall 21 of cup 15 and of the forward boot flange 19 with the washer or sealing washer 22.

Sealing ring 22, immediately adjacent flange 19 of boot 16, is desirably molded of an anti-friction substance such as a phenolic condensation product impregnated with graphite. Other materials having the required strength together with enduring wearing properties may be substituted therefor. Sealing washer 22 has an annular nose 23 with a capped or ground face 50 on its forward end that makes a rotary fluid sealing engagement with the radial face 24 of the hub 12, thus guarding against the passage of fluid therepast.

In accordance with the present invention, sealing washer 22 has a rearwardly axially extended circumferential portion 25 that is telescoped within boot 16 and the rear end 26 of which provides an abutment for the middle section 20 of the distortable boot 16. Boot flange 19 abuts the radial flange 27 of the washer, on the sealing ring rear face 51.

A series of annularly spaced torque transmitting grooves 31 extend axially along the length of the central opening 28 of the sealing washer. A plurality of spaced apart blind grooves 29 extend axially forwardly of shoulders 30 and terminate in counterbore 32.

For cooperation with the grooves 29 and grooves 31 of the sealing washer 22, the metal cup 15 has an internal tubular part 33 (best seen in FIGURE 4) that is forwardly extended as at 34 to telescope within the sealing washer 22, that is, into the internal periphery of washer 22. At its forward end 34, tube 33 carries a series of outwardly extending enlargements or ribs 36 annularly spaced thereabout to correspond and register respectively with grooves 31 in sealing washer 22. As here shown, the tube end 34 has outwardly punched nipples 35 adapted to snap into blind grooves 29. Ribs 36 are conveniently formed by slight bulges in the forward end 34 of the tube and the nipples 35 may be formed by punching outwardly from internal surface of tube 33.

In seal assembly, as at the factory, the sealing ring 22 is slid onto the tube 33, whereupon the outwardly punched nipples 35 snap over the shoulders 30 to lie in slots 29 and are thereafter adapted to abut the forwardly facing shoulders 30 and prevent separation of the parts of the seal. It will be understood that boot 16, peripheral rings 40 and 41 along with its encircling spring 17 are first inserted into cup 15 with the sealing ring 22 as shown. Thus, the rear flange 18 of the boot 16 makes a tight annular sealing engagement at 38 on the radial rear wall 21 of cup 15. Spring 17 exerts pressure against ring 41 which in turn presses boot flange 19 against ring face 50 and prior to installation of the seal in use, presses shoulders 30 of ring 22 against nipples 35 engaged in slots 29 of the tube 33.

FIGURE 3 best shows the seal parts in the position they occupy prior to assembly within a pump and as the assembly may be shipped from the factory. Desirably, even at this time spring 17 is under some compression so as to provide a preloaded effect, resiliently maintaining sealing ring 22 at the limit of its permitted outward axial movement as determined by the engagement of nipples 35 with the forwardly facing shoulders 30 of slots 29.

In installation in the pump, as shown in FIGURES 1 and 2, the seal assembly, including the sealing ring 22 is stationary, while shaft 11 rotates, torque forces tending to rotate the sealing ring 22 being transmitted through grooves 31 and ribs 36 to the stationary cup 15. At the same time the seal is under compression, axial movement of the sealing ring 22 under the influence of its spring 17 is permitted to compensate for wear on the nose face 50.

So constructed and arranged, the ribs 36 engaging with the grooves 31, prevent relative rotation of the sealing ring 22 with respect to the cup 15 and boot 16, while, since the shoulders 30 are not immediately adjacent the rear of the nipples 35, relative longitudinal or axial movement is permitted under the influence of retraction or expansion of spring 17, as seen in FIGURE 2.

It may be noted, the seal assembly, including the sealing ring, is held together as a unitary device which may be so shipped from the factory without danger of accidental separation of its parts, and, at the same time an interlocking is realized that permits preloading of the spring and transmittal to the metal cup 15 of torque forces acting on the ring.

Limited insertion of the cup 15 in the housing recess 14 is effected by the peripheral annular flange 15a of the cup which abuts the forward face of the housing, thus also enhancing the sealing function thereat.

An illustrative embodiment of the invention having been disclosed, it is to be understood that such changes may be made including modifications or additions, as fall within the spirit of the invention and the scope of the appended claims.

I claim:

1. In an annular fluid seal, a body portion of rubber-like material, a tubular member in a keyed sealing ring, said body portion having a central cylindrical portion and annular inner and outer diaphragm-like flanges, said inner flange and cylindrical portion contiguous with said tubular member, said keyed sealing ring having a central opening constituting the internal periphery of said ring with a plurality of spaced slots in said internal periphery, the internal periphery of said ring having an axially forwardly facing shoulder portion co-terminus with each slot and at least one groove in the periphery of said ring angularly spaced from said shoulder portion that extends through the length of said internal periphery, said tubular member situated within said central opening of said ring, first enlargements on said tubular member sliding in said grooves to key said ring and said tubular member against relative rotative movement, and second nipple-like extensions on said tubular member of a dimension sufficient to allow said tubular member to snap into locking engagement with said sealing ring, said nipple-like extensions abutting said shoulder portion of said slots in said ring to limit relative axial movement of said ring and tubular member in one direction.

2. In an annular sealing device with a keyed sealing ring having a central internal opening constituting an internal periphery of said ring, a rear end and a forward end, slots in said internal periphery spaced circumferentially about and terminating short of said rear end relatively closely thereto and opening into said forward end, each of said slots providing a forwardly facing shoulder in said internal periphery, a plurality of through grooves in said internal periphery, said grooves spaced circumferentially about said internal periphery and alternating with said slots, each groove opening into both said rear end and said forward end, a tubular member in said opening having circumferentially spaced enlargements registering with and relatively slidable axially in said grooves respectively, and outwardly dented nipple-like portions on the forward end of the tubular member of a dimension sufficient to allow said tubular member to snap into locking engagement with said sealing ring, said nipple-like portions registering with and relatively axially slidable in said slots and registering with said shoulders respectively.

References Cited by the Examiner

UNITED STATES PATENTS

| | | | |
|---|---|---|---|
| 2,462,280 | 2/49 | Payne | 277—32 |
| 2,472,257 | 6/49 | Matter | 277—84 |
| 2,506,447 | 5/50 | Greiner | 277—32 |
| 2,610,075 | 9/52 | Haake | 277—90 |
| 2,695,799 | 11/54 | Chambers et al. | 277—90 |
| 2,832,130 | 4/58 | Harvey | 29—453 |
| 3,047,298 | 7/62 | St. Clair et al. | 277—115 XR |
| 3,054,173 | 9/62 | Laurent | 29—453 |

FOREIGN PATENTS 618,100    4/61    Canada.

EDWARD V. BENHAM, *Primary Examiner.*
SAMUEL ROTHBERG, *Examiner.*